United States Patent
Cho

(10) Patent No.: US 8,453,803 B2
(45) Date of Patent: Jun. 4, 2013

(54) BRAKE ACTUATING APPARATUS USING AN ELECTRIC MOTOR

(75) Inventor: Han-Yong Cho, Yongin-si (KR)

(73) Assignee: Wheel Corporation (KR)

( * ) Notice: Subject to any disclaimer, the term of this patent is extended or adjusted under 35 U.S.C. 154(b) by 0 days.

(21) Appl. No.: 12/143,360

(22) Filed: Jun. 20, 2008

(65) Prior Publication Data

US 2008/0314700 A1    Dec. 25, 2008

Related U.S. Application Data

(63) Continuation of application No. 11/529,153, filed on Sep. 28, 2006, now abandoned, which is a continuation of application No. PCT/KR2005/000904, filed on Mar. 28, 2005.

(30) Foreign Application Priority Data

Mar. 29, 2004   (KR) ......................... 10-2004-0021218

(51) Int. Cl.
    *F16D 55/08*       (2006.01)
    *F16D 65/00*       (2006.01)

(52) U.S. Cl.
    USPC .......................... 188/72.1; 188/156; 188/290

(58) Field of Classification Search
    USPC .............. 188/72.1, 72.4, 72.6, 352, 157, 156, 188/290
    See application file for complete search history.

(56) References Cited

U.S. PATENT DOCUMENTS

| | | | | |
|---|---|---|---|---|
| 3,581,857 A | * | 6/1971 | Dallman | 192/41 R |
| 4,049,103 A | * | 9/1977 | Sessler | 192/105 CD |
| 4,172,510 A | * | 10/1979 | Forkel | 188/379 |
| 4,435,021 A | * | 3/1984 | Hoenick | 303/10 |
| 4,487,295 A | * | 12/1984 | Mitchell | 188/72.6 |
| 4,565,265 A | * | 1/1986 | Woolley | 188/72.6 |
| 4,865,160 A | | 9/1989 | Casey | |
| 5,348,123 A | | 9/1994 | Takahashi et al. | |
| 5,450,827 A | * | 9/1995 | Kang | 123/193.2 |
| 5,664,645 A | * | 9/1997 | Rodriguez | 188/1.12 |
| 5,682,965 A | * | 11/1997 | Prinzler | 188/72.4 |
| 5,782,322 A | * | 7/1998 | Hauck et al. | 188/72.4 |
| 6,089,359 A | | 7/2000 | Tanaka | |
| 6,837,342 B1 | | 1/2005 | Olschewski et al. | |
| 6,865,763 B2 | * | 3/2005 | Sears | 8/159 |
| 2007/0108000 A1 | * | 5/2007 | Derr et al. | 188/290 |

FOREIGN PATENT DOCUMENTS

| | | |
|---|---|---|
| JP | 64-058827 A | 3/1989 |
| JP | 08-253115 A | 10/1996 |
| JP | 6458827 A * | 3/1998 |

OTHER PUBLICATIONS

PCT Search Report regarding PCT Application No. PCT/KR2005/000904 dated Jul. 26, 2005.

* cited by examiner

*Primary Examiner* — Melody Burch
(74) *Attorney, Agent, or Firm* — Knobbe Martens Olson & Bear, LLP.

(57) ABSTRACT

A brake actuating apparatus includes a caliper body with a cylinder. An electric motor is fixed to the caliper body. A pressing piston is installed in the cylinder. A rotational shaft is installed at the center of the housing to be rotated by the motor. A head is attached to the rotational shaft and defines a fluid-receiving space in cooperation with the housing. The rotation of head varies the volume of space, thereby moving the pressing piston.

20 Claims, 14 Drawing Sheets

Prior Art

BRAKE ACTUATING APPARATUS USING AN ELECTRIC MOTOR

CROSS-REFERENCE TO RELATED APPLICATIONS

This application is a continuation application of U.S. application Ser. No. 11/529,153 filed Sep. 28, 2006, now abandoned, which is a continuation application under 35 U.S.C. §365(c) of International Application No. PCT/KR2005/000904, filed Mar. 28, 2005 designating the United States. International Application No. PCT/KR2005/000904 was published in English as WO2005/092685 A1 on Oct. 6, 2005. This application further claims the benefit of the earlier filing dates under 35 U.S.C. §365(b) of Korean Patent Application No. 10-2004-0021218 filed Mar. 29, 2004. This application incorporates herein by reference U.S. application Ser. No. 11/529,123, International Application No. PCT/KR2005/000904 including International Publication No. WO2005/092685 A1 and Korean Patent Application No. 10-2004-0021218 in their entirety.

BACKGROUND

1. Field

The present disclosure relates to a brake actuating apparatus, and more particularly, to a brake actuating apparatus using an electric motor.

2. Discussion on Related Technology

A typical hydraulic braking apparatus comprises a hydraulic circuit, wherein pedal pressure generated through depression of a pedal by a driver is increased in a master cylinder and a booster and then transmitted through hydraulic tubing to a braking apparatus mounted to each of road wheels. The hydraulic brake has disadvantages in that it is impossible to perform braking if the hydraulic tubing is damaged, it takes a great deal of time to transmit a pedal operation signal for braking to the brake through the hydraulic tubing, resulting in poor responsiveness, and a plurality of parts including the hydraulic tubing are required, resulting in the increased weight of a vehicle.

Recently, there has been proposed a braking apparatus, wherein instead of such a complicated hydraulic circuit, a motion converting means such as a ball screw is used for converting a rotational motion from a motor to a linear motion so as to urge a brake pad, thereby performing the braking function. Such a type of braking apparatus is called "brake-by-wire" type and has an advantage of easy control. As for the "brake-by-wire" type braking apparatus, however, a relatively large-sized motor, a reducer and a means for converting a rotational force of the motor into a liner motion are inevitably required in order to obtain an appropriate braking force. Moreover, the braking apparatus may further have a clutch used for controlling transmission and interruption of the power from the motor in order to improve the responsiveness of the brake, which causes disadvantages of increase in the volume of the apparatus, difficulty in manufacturing the apparatus, and increased costs. Particularly, the apparatus has a drawback in that mechanical braking cannot be performed if an unexpected electrical failure or defect is produced in the apparatus.

As a braking apparatus for solving the problems in the hydraulic braking apparatus and the "brake-by-wire" type braking apparatus, there has been proposed an apparatus that employs a hybrid braking system using both a motor and hydraulic pressure. U.S. Pat. No. 5,348,123 entitled "Brake Actuating Apparatus for a Vehicle" discloses the technical constitution of a braking apparatus that controls the pressure of a fluid in a cylinder for urging a brake pad, using a motor. As shown in FIG. 16, the patent discloses a brake system in which a rotational motion from a motor 3 is converted into a linear motion by means of a ball screw 5 and then transmitted to a driving piston 7 and the advance of the driving piston 7 causes a working fluid 1 to urge a pressing piston 9 so that the pressing piston can be moved forward, thereby performing braking.

However, the brake actuating apparatus disclosed in the U.S. Patent should inevitably have a motion converting means such as a ball screw in order to convert the rotational motion from the motor to the linear motion. Further, the brake actuating apparatus should be additionally provided with a structure for securely returning the member, which has been moved forward through the conversion of the rotational motion into the linear motion by the motion converting means, after braking. Accordingly, there are disadvantages in that the structure of the apparatus is complicated, it is difficult to manufacture and assemble the apparatus, and production costs increase.

The discussion in this section is to provide general background information, and does not constitute an admission of prior art.

SUMMARY OF CERTAIN INVENTIVE ASPECTS

An aspect of the invention provides a brake actuating apparatus, which may comprise: a caliper body comprising a cylinder, which comprises a first end and a second end; a piston movably engaged with the cylinder at the first end, wherein at least one of the piston and the caliper body is configured to hold a brake pad; a shaft rotatable about an axis; a plug engaged with the cylinder at the second end, the plug comprising a head receiver; and a head connected to the shaft at a distance from the axis, the head being rotatable about the axis and movable relative to the plug as the shaft rotates about the axis, the head being received by and movably engaged with the head receiver; wherein the cylinder, the piston and the plug in combination define a first space having a first volume, which is variable depending upon a position of the piston relative to the plug; wherein the head receiver in combination with the head defines a second space having a second volume, which is variable depending upon the position of the head relative to the plug, the second space being in fluid communication with the first space; wherein the sum of the first volume and the second volume is substantially constant.

In the foregoing apparatus, the head receiver may comprise a groove formed in the plug. The groove may be configured to guide rotational movement of the head about the axis. At least part of the head may be slidably engaged within the groove. The groove may have an opening facing the first space. The head receiver may further comprise a hole extending circumferentially about the axis from the groove, and wherein the head comprises a rod engaged with the hole and slidable relative to the hole. The rod may have a cross-sectional shape selected from the group consisting of circle, oval and polygon. The apparatus may further comprise a sealing ring surrounding the rod. The head receiver may comprise one or more additional grooves, wherein the groove and the one or more additional grooves are disposed in the plug with the substantially same angular interval between two immediately neighboring grooves.

Still in the foregoing apparatus, the apparatus may further comprise a connector connecting between the shaft and head. At least part of the connector may be located within the first space. At least part of the connector may be located between the plug and the piston. The second space may be defined by one or more walls formed in the plug, and wherein the plug may further comprise a passage interconnecting the first and second spaces, the passage enabling the fluid communication between the first and second spaces. At least part of the plug may be located between the head and the piston.

Further in the foregoing apparatus, he plug may comprise a first circular disk having a first radius and a second disk having a second radius, wherein the first and second circular disks may be integrated with each other, wherein the first disk may face the first space, and wherein the first radius may be smaller than the second radius. The plug may comprise a through hole extending along the axis and the shaft passes through the through hole. The apparatus may further comprise an electric motor attached to the caliper body and configured to rotate the shaft. The head may be movable between a first position and a second position, wherein the head may be configured to rotate in a first rotational direction, stop at a third position and rotate in a second rotational direction which is opposite to the first rotational direction, and wherein the third position may be located between the first position and the second position.

Another aspect of the invention provides an automobile, which may comprise: the foregoing apparatus, wherein the first and second spaces are filled with a brake fluid; and a brake pad attached to the at least one of the piston and the caliper body. The automobile may comprise one selected from the group consisting of passenger car, truck, bus, golf cart and motor cycle.

Still another aspect of the invention provides a method of actuating a brake, which may comprise: providing the foregoing apparatus; rotating the shaft in a first direction so as to rotate the head about the axis and to move relative to the plug, whereby the second volume decreases, at least part of the fluid moves from the second space to the first space, and the piston moves relative to the caliper body. The method may further comprise rotating the shaft in a second direction opposite to the first direction so as to rotate the head about the axis and move relative to the plug, whereby the second volume increases, at least part of the fluid moves from the first space to the second space, and the piston moves relative to the caliper body.

An aspect of the present invention is to provide a brake actuating apparatus that uses both an electric motor and a fluid and converts a rotational motion from the motor into a force for pressurizing the fluid so that a frictional member such as a brake pad can be pressed against a brake disk, thereby performing a braking function, without a means for converting the rotational motion from the motor into a linear motion.

Another aspect of the present invention is to provide a brake actuating apparatus that further comprises a means for mechanically pressing the frictional member such as a brake pad against the brake disk to perform the braking function if the electric motor is out of order.

A brake actuating apparatus according to an aspect of the present invention comprises a caliper body with a cylinder; a motor fixed to the caliper body; a pressing piston installed in the cylinder to move forward and rearward, for pressing a brake pad disposed to be brought into frictional contact with a frictional surface of a brake disk when the pressing piston moves forward; a disk-shaped housing that is spaced apart by a predetermined distance rearward from the pressing piston and fixedly installed at the cylinder to maintain airtightness between an inner periphery of the cylinder and the housing and has at least one opening formed therein to be directed toward a space between the pressing piston and the housing; a rotational shaft installed in the housing to rotate by receiving a rotational force transmitted from the motor; a power transmission means for transmitting the rotational force of the motor to the rotational shaft; and a fluid-pressurizing member that is installed in the housing and has a first end fixed to the rotational shaft and a second end with a portion thereof received in the opening of the housing so as to define a closed fluid-receiving space by the pressing piston, the housing and the portion of the second end received in the opening. The fluid-pressurizing member enters the closed fluid-receiving space to increase pressure in the fluid-receiving space so that the pressing piston is urged if the rotational shaft is rotated in one direction, and the fluid-pressurizing member is retracted from the closed fluid-receiving space into the housing if the rotational shaft is rotated in an opposite direction.

The opening of the housing may comprise a guide groove formed to have a predetermined radius of curvature, width and central angle around the rotational shaft and to face the fluid-receiving space, a first passage extending by a predetermined length from a circumferential end of the guide groove into the housing with the same radius of curvature as the guide groove and a predetermined sectional shape, and a second passage communicating with the first passage and extending to a rear surface of the housing. The second end of the fluid-pressurizing member, which defines the fluid-receiving space in cooperation with the housing and generates pressure transmitted to the pressing piston, may have the substantially same radius of curvature and sectional shape as the first passage, and a portion of the second end may be located in the guide groove and another portion of the second end may be received in the first passage to be moved into and withdrawn from the fluid-receiving space by means of rotation of the rotational shaft.

In an embodiment of the present invention, when the fluid-pressurizing member fixed to the rotational shaft receives the rotational force of the motor and the second end of the fluid-pressurizing member enters the fluid-receiving space along the guide groove of the housing, the volume of the fluid-receiving space decreases and the pressure of the working fluid received in the fluid-receiving space increases. The increased pressure of the working fluid is applied to an inner surface of the pressing piston, so that the pressing piston is advanced to urge a brake pad. The urged brake pad is brought into contact with a frictional surface of a brake disk, thereby performing a braking function. The brake actuating apparatus according to an embodiment of the present invention does not have a means for converting the rotational motion from the motor into a linear motion for urging the pressing piston. That is, the fluid-pressurizing member is connected to and rotated with the rotational shaft. Further, in an embodiment of the present invention, the sectional area of the fluid-pressurizing member defining the fluid-receiving space is smaller than that of the pressing piston. A large force can be applied to the pressing piston to perform the braking function even though the fluid-pressurizing member is rotated with a small force, according to the Pascal's theory regarding a fluid. That is, the sectional area of the second end of the fluid-pressurizing member in a rotating direction, which enters the fluid receiving space, is significantly smaller than the sectional area of the pressing piston in a moving direction. Accordingly, when the fluid-pressurizing member is caused to enter the fluid-receiving space with a small force, pressure produced in the fluid-receiving space is applied to the pressing piston with a larger sectional area according to the Pascal's theory, so that the brake pad is urged with a large force.

In an embodiment of the present invention, the guide groove of the opening formed in the housing may be formed in a front surface of the housing directed toward the pressing piston, or a small diameter portion protruding toward the pressing piston may be formed in the housing and the guide groove may be formed in a side surface of the small diameter portion directed toward the inner periphery of the cylinder.

If the guide groove is formed in the front surface of the housing directed toward the pressing piston, the second end of the fluid-pressurizing member may be inserted into and placed in the first passage through the guide groove, or the second end of the fluid-pressurizing member may be inserted into and placed in the first passage through the second passage. Preferably, the housing comprises a first disk formed with the guide groove and the first passage and a second disk formed with the second passage communicating with the first passage, a radially outer wall of the first disk at which the guide groove will be formed, and a surface of the first disk which is directed toward the second disk and at which the first passage will be formed are partially removed, the fluid-pressurizing member is provided between the first disk and the second disk, the first end of the fluid-pressurizing member is fixed to the rotational shaft, and the second end thereof has a stepped arcuate projection formed to be inserted into the first passage. In this case, the guide groove and the first passage are defined by the inner periphery of the cylinder and the first and second disks.

If a small diameter portion protruding toward the pressing piston is formed in the housing and the guide groove is formed in a side surface of the small diameter portion directed toward the inner periphery of the cylinder, the housing preferably comprises a first disk provided with a large diameter portion and a small diameter portion, and a second disk formed with the second passage. The first disk has the large diameter portion and the small diameter portion protruding toward the pressing piston, and is formed with a guide groove in a side surface of the small diameter portion directed toward the inner periphery of the cylinder and a first passage extending circumferentially from the guide groove. The second disk is formed with a through-hole communicating with the first passage. Further, a radially inner wall of the first disk at which the guide groove and the first passage will be formed and a surface of the first disk directed toward the second disk are removed, the fluid-pressurizing member is installed between the first and second disks and disposed such that the second end can be inserted into the first passage to rotate through a certain angle. In this case, the guide groove and the first passage are defined by the first disk, the second disk and the fluid-pressurizing member. For the purpose of easiness of manufacture, it is preferred that circumferential sidewalls for defining the first passage be removed in the small diameter portion of the first disk and an additional sidewall ring be inserted between the small diameter portion of the first disk and the fluid-pressurizing member to form sidewalls of the first passage. The sidewall ring takes the shape of a ring with a predetermined width and has a through-hole formed at a position corresponding to the guide groove formed in the small diameter portion. The sidewall ring also has sidewalls formed on an inner periphery thereof at positions corresponding to the removed circumferential sidewalls for defining the first passage.

Moreover, in order to transmit a larger braking force, a plurality of guide grooves and first passages may be formed at a predetermined interval on a circle with a radius of curvature in the housing, and a plurality of fluid-pressurizing members may be fixed to the rotational shaft at the same interval as the guide grooves. The moving distance of the pressing piston for urging the disk pad is obtained by dividing the volume of the fluid-pressurizing members inserted into the fluid-receiving space by the sectional area of the pressuring piston. Accordingly, the stroke of the pressing piston can be appropriately adjusted by properly selecting the number, length and sectional area of the fluid-pressurizing members moved into the fluid-receiving space by means of rotation.

Furthermore, in the brake actuating apparatus according to an embodiment of the present invention, to supplement the working fluid upon leak thereof due to operation for a long time, an oil-supplying hole communicating with an outer periphery of the housing is formed in a radially outer side surface of the guide groove of the housing, and the brake actuating apparatus further comprises an oil-supplying tank that has an oil-supplying port communicating with the oil supplying hole, and a working fluid contained therein.

To mechanically rotate the rotational shaft if the motor is out of order, it is more desirable that the brake actuating apparatus according to an embodiment of the present invention further comprise a lever for rotating the rotational shaft only in a direction in which the fluid-pressurizing member enters the fluid-receiving space.

DETAILED DESCRIPTION OF EMBODIMENTS

Hereinafter, various embodiments of the present invention will be described in detail with reference to the accompanying drawings.

Figure 1:
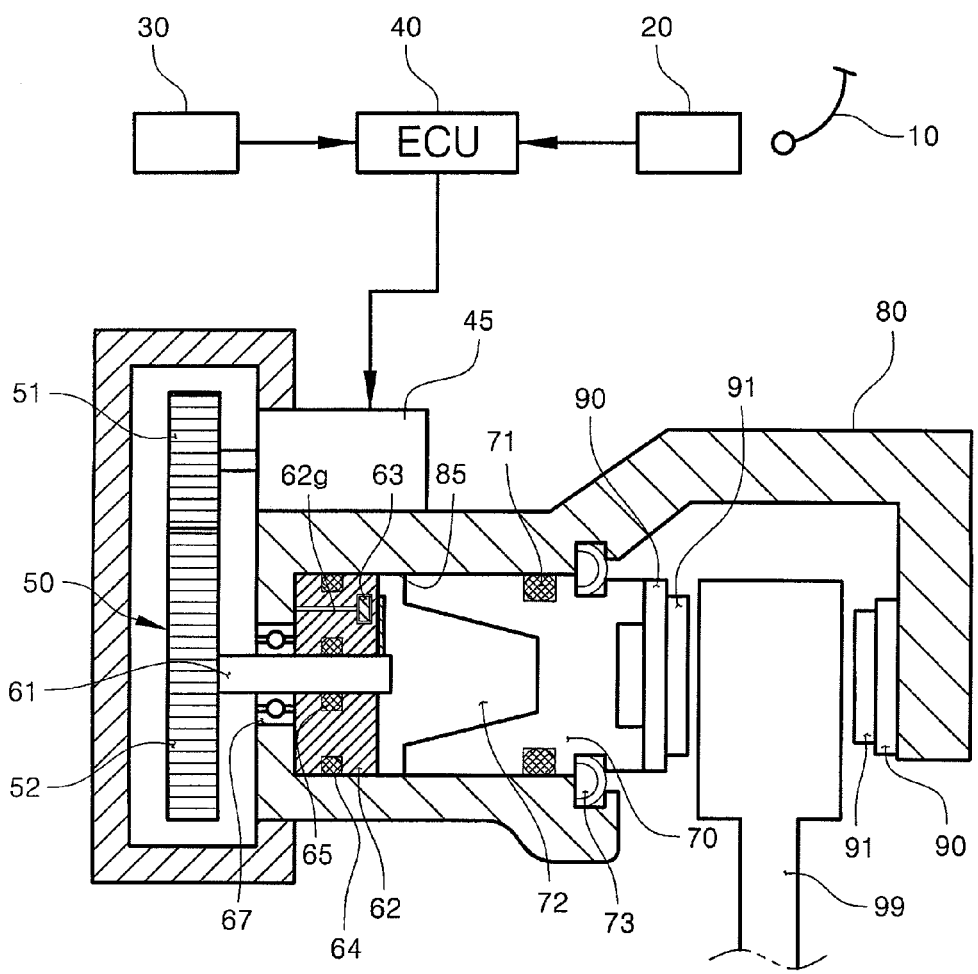
FIG. 1 is a schematic view of a brake actuating apparatus according to an embodiment of the present invention.
Figure 2:
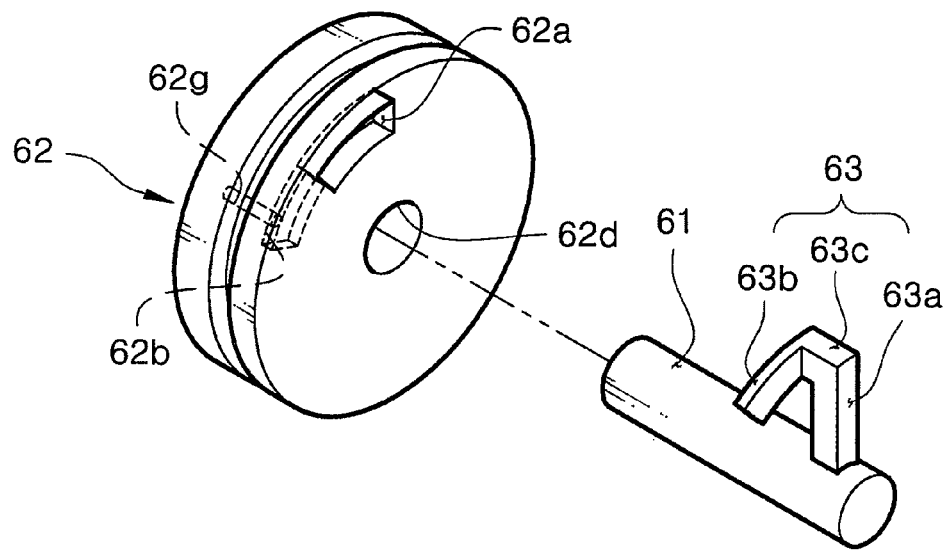
FIG. 2 is a perspective view of an embodiment of a housing and a fluid-pressurizing member of the brake actuating apparatus shown in FIG. 1, with the housing and the fluid-pressurizing member separated from each other.

FIG. 1 is a schematic view of a brake actuating apparatus according to an embodiment of the present invention, and FIG. 2 is a perspective view of an embodiment of a housing and a fluid-pressurizing member of the brake actuating apparatus shown in FIG. 1, with the housing and the fluid-pressurizing member separated from each other.

As shown in FIG. 1, the brake actuating apparatus of this embodiment comprises a caliper body 80 with a cylinder 85, an electric motor 45 fixed to the caliper body 80, a pressing piston 70 installed within the cylinder 85, a housing or plug 62 that is spaced apart rearward by a predetermined distance from the pressing piston 70 and installed fixedly at the cylinder 85 to maintain airtightness with an inner periphery of the cylinder 85, a rotational shaft 61 installed at the center of the housing 62 to be rotated by receiving a rotational force transmitted from the motor 45, and a power transmission means 50 for transmitting the rotational force of the motor 45 to the rotational shaft 61.

Referring to FIG. 2, the housing 62 takes the shape of a disk and is formed with at least one opening or head receiver directed toward a space between the housing and the pressing piston 70. The opening comprises a guide groove 62a formed in a front surface of the housing directed toward the pressing piston 70, a first passage 62b extending by a predetermined length at a circumferential end of the guide groove 62a into the housing 62, and a second passage 62g extending at a rear side of the first passage 62b to communicate with a rear surface of the housing 62. Further, the brake actuating apparatus of this embodiment comprises a fluid-pressurizing member or head 63 fixed to the rotational shaft 61 to define a fluid-receiving space 72 hermetically closed by the pressing piston 70, the inner periphery of the cylinder 85 and the housing 62. The fluid-pressurizing member 63 is installed such that it can be moved into and retreated from the inside of the fluid-receiving space 72. Referring to FIG. 2, as for the fluid-pressurizing member 63 in this embodiment, a first end 63a thereof is fixed to the rotational shaft 61 and a portion of a second end or rod 63b is inserted into the first passage 62b through the guide groove 62a of the housing 62. The first and second ends 63a and 63b are connected to each other via an intermediate portion 63c. Accordingly, the closed fluid-receiving space 72 is defined by the inner periphery of the cylinder 85, the pressing piston 70, the housing 62 and the second end 63h of the fluid-pressurizing member 63 inserted into the first passage 62b.

In this embodiment, the caliper body 80 is, but not limited to, a floating type caliper that supports brake pads such that the brake pads can be moved in an axial direction of a brake disk 99 upon braking. Brake pads 90 are installed to face both frictional surfaces of the brake disk 99. When the pressure of a working fluid in the fluid-receiving space 72 increases, the pressing piston 70 advances rightward in FIG. 1 to urge the brake pads 90. Linings 91 of the pair of the brake pads 90 are disposed to come into contact with the frictional surfaces of the brake disk 99. A sealing O-ring 71 is mounted on an outer periphery of the pressing piston 70. Reference numeral 73 designates a seal ring for preventing dust and the like from intruding into a clearance between the cylinder of the caliper body 80 and the pressing piston 70.

The housing 62 is spaced apart by the predetermined distance rearward from the pressing piston 70 and fixedly installed at that position to define the closed fluid-receiving space 72 between the housing 62 and the pressing piston 70. Although the housing 62 in this embodiment has a cylindrical shape and is fixedly installed on the inner periphery of the cylinder 85, it is not limited thereto. The housing may be installed at the rear of the cylinder to define the closed fluid-receiving space 72 between the pressing piston 70 and the housing. A sealing O-ring 64 is provided between an outer periphery of the housing 62 and the inner periphery of the cylinder 85. Referring to FIG. 2, the housing 62 in this embodiment has the guide groove 62a formed in the front surface thereof directed toward the pressing piston 70. The guide groove 62a takes the shape of an arc with a predetermined radius of curvature, width and central angle. Further, the first passage 62b is formed at the circumferential end of the guide groove 62a of the housing 62 to extend into the housing 62 by the predetermined length. The first passage 62b has the same radius of curvature as the guide groove 62a, and a predetermined shape in cross section. Moreover, the second passage 62g is formed in the housing 62 to extend from the rear side of the first passage 62b and to communicate with the rear surface of the housing 62. The second passage 62g functions to cause air to be sucked or exhausted therethrough, thereby ensuring smooth movement of the movable member 63. The guide groove 62a, the first passage 62b and the second passage 62g constitute the opening of the housing 62. Reference numeral 62d that has not been explained designates a shaft supporting hole for use in receiving and supporting the rotational shaft 61.

Referring to FIG. 2, the fluid-pressurizing member 63 of the illustrated embodiment comprises the first end 63a fixed to the rotational shaft 61 and radially extending by a predetermined length, the intermediate portion 63c axially extending from the first end by a predetermined length, and the second end 63b circumferentially extending from the intermediate portion 63c to have a radius of curvature that is substantially identical with that of the guide groove 62a and the first passage 62b. The second end 63b of the fluid-pressurizing member 63 is a free end and has a radius of curvature and a sectional shape that are substantially identical with those of the first passage 62b. When the fluid-pressurizing member is installed, a portion of the second end 63b is placed in the guide groove 62a and another portion thereof is inserted into and received in the first passage 62b. That is, the second end 63b of the movable member 63 inserted into the first passage 62b is adapted to rotate in the first passage 62b while being guided by the guide groove 62a upon rotation of the rotational shaft 61. Further, the first passage 62b and the second end 63b of the movable member 63 have the substantially same shape in cross section and can be slid relative to each other in a contact state, so that if the movable member 63 is moved in the first passage 62b, the working fluid in the fluid-receiving space 72 can be prevented from leaking into the second passage 62g through the first passage 62b. Although not shown, a sealing member may be further installed to prevent the working fluid from leaking through a clearance between the second end 63b of the movable member 63 and the first passage 62b, if necessary.

Figure 16:
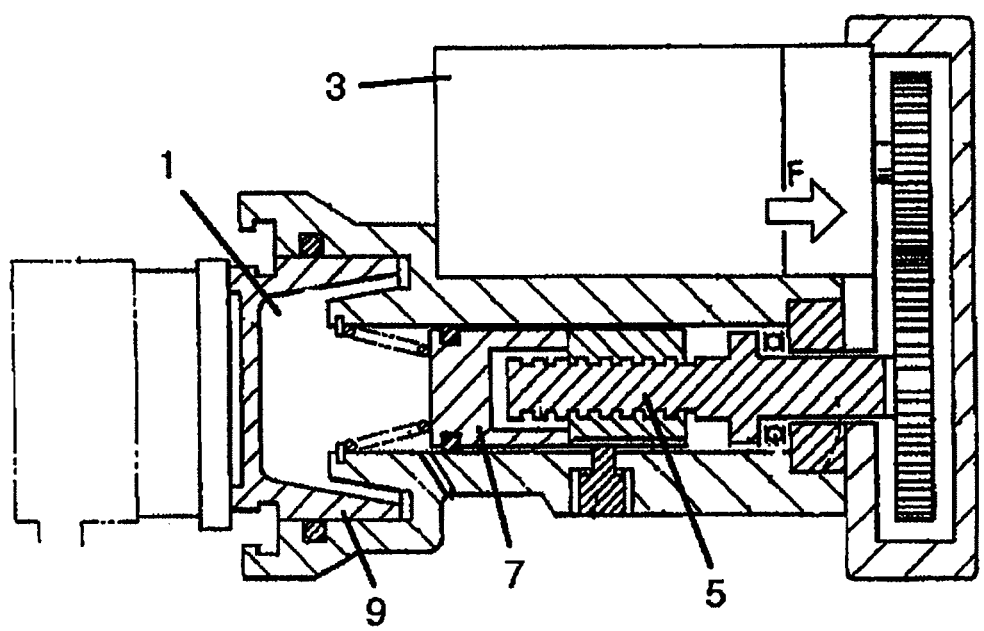
FIG. 16 is a schematic view of an exemplary brake actuating apparatus for a vehicle.

The rotational shaft 61 is installed at the center of the housing 62 to be rotated through certain angles by receiving the rotational force transmitted from the motor 45. When the rotational shaft 61 is rotated in one direction, the second end 63b of the fluid-pressurizing member 63 that has been moveably inserted into the first passage 62b enters into the fluid-receiving space 72 from the inside of the housing 62 to increase the pressure of the working fluid, thereby causing the pressing piston 70 to advance. When the rotational shaft 61 is rotated in an opposite direction, the second end 63b of the fluid-pressurizing member 63 is moved from the fluid-receiving space 72 and then received within the housing 62 to decrease the pressure of the working fluid, thereby causing the pressing piston 70 to retract. Contrary to the brake actuating apparatus shown in FIG. 16, in the brake actuating apparatus of this embodiment comprising the rotational shaft 61, the housing 62 and the fluid-pressurizing member 63, the rotational force is transmitted to the fluid-pressurizing member 63 that in turn directly pressurizes the working fluid without converting a rotational motion from the motor into a linear motion. Thus, the pressing piston 70 is advanced to perform a braking function. Moreover, contrary to a hydraulic brake actuating apparatus, the pressing piston 70 can be advanced using the motor without additional supply of an external working fluid into the fluid-receiving space 72 in the cylinder so as to perform the braking function.

Referring to FIG. 1, the motor 45 can rotate in forward and reverse directions and is fixed to the caliper body 80. In this embodiment, the power transmission means 50 comprises a first gear 51 coupled to a shaft of the motor and a second gear 52 engaged with the first gear 51 and fixed to the rotational shaft 61. The power transmission means 50 adjusts the rotational force of the motor to obtain a proper speed and torque and transmits it to the rotational shaft 61 of a movable means 60. Accordingly, the power transmission means is not limited to the illustrated embodiment, but can be modified to any other configurations by using a reducer such as an appropriate number of gears or a harmonic drive. Although not shown, the brake actuating apparatus for a vehicle according to this embodiment may also further have an additional means for returning the fluid-pressurizing member 63 to its initial position, which is a position thereof prior to braking, after the pressing piston 70 has advanced to perform the braking function. That is, when the rotational force of the motor 45 is not transmitted to the rotational shaft 61, a returning spring may be provided between the movable member and the guide groove so as to return the movable member to its initial position.

Next, the operation of this embodiment will be briefly described with reference to FIG. 1. Once a driver of a vehicle depresses a brake pedal for braking the vehicle, a pressure sensor 20 detects pressure applied to the brake pedal and transmits a signal corresponding to the detection to an electronic control unit 40. The electronic control unit 40 transmits a motor control signal to the motor 45 so as to control braking of each road wheel, in response to a signal transmitted from an additional driving condition sensor 30 for detecting the speed of the vehicle and the like and the signal transmitted from the pressure sensor 20. When the motor 45 is rotated in response to the motor control signal, the rotational force of the motor 45 is transmitted to the rotational shaft 61 through the first and second gears 51 and 52 of the power transmission means 50.

Upon rotation of the rotational shaft 61, the movable member 63 fixed to the rotational shaft 61 is rotated so that the second end 63b of the movable member is withdrawn from the first passage 62b of the housing 62 and pushes the working fluid received in the guide groove 62a. As the volume of the fluid-receiving space 72 is decreased, the pressure of the working fluid increases and the pressing piston 70 is advanced rightward in the figure due to the increased pressure of the working fluid, thereby performing braking. At this time, the sectional area of the pressing piston 70 is greatly larger than that of the second end 63b of the fluid-pressurizing member 63. Therefore, the second end 63b of the fluid-pressurizing member 63 is introduced into the fluid-receiving space 72 with a small force according to the Pascal's theory. The increased pressure of the working fluid is applied to the pressing piston 70 with a larger sectional area, so that the brake pads 90 can be urged with a large force. According to the Pascal's theory, the braking force can be boosted, and thus, it is possible to make the motor compact.

Figure 3:
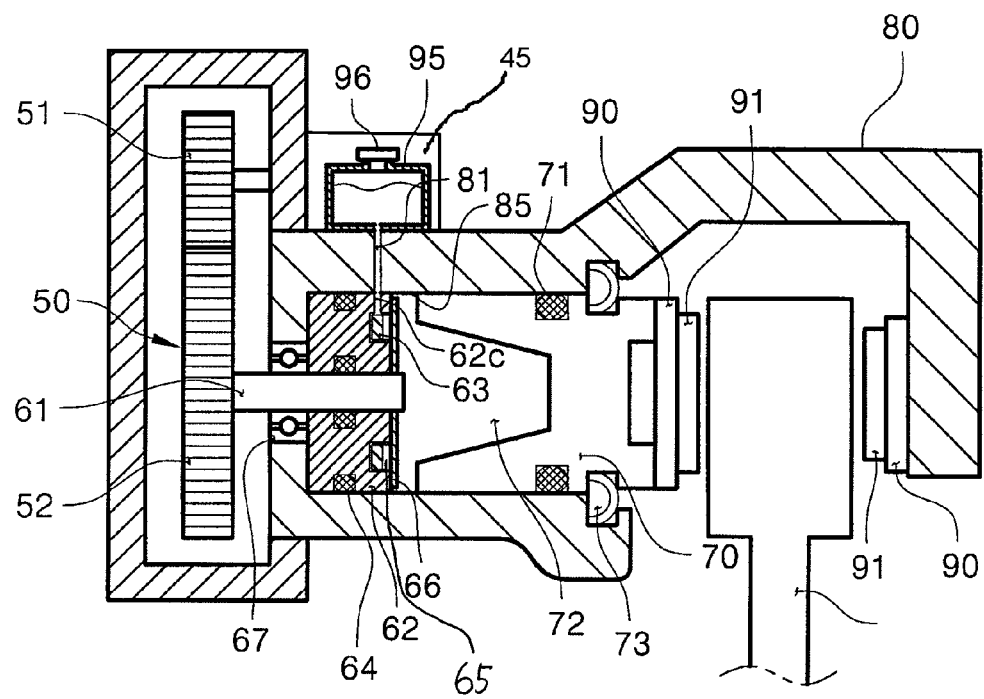
FIG. 3 is a schematic view of a brake actuating apparatus according to another embodiment of the present invention.
Figure 4:
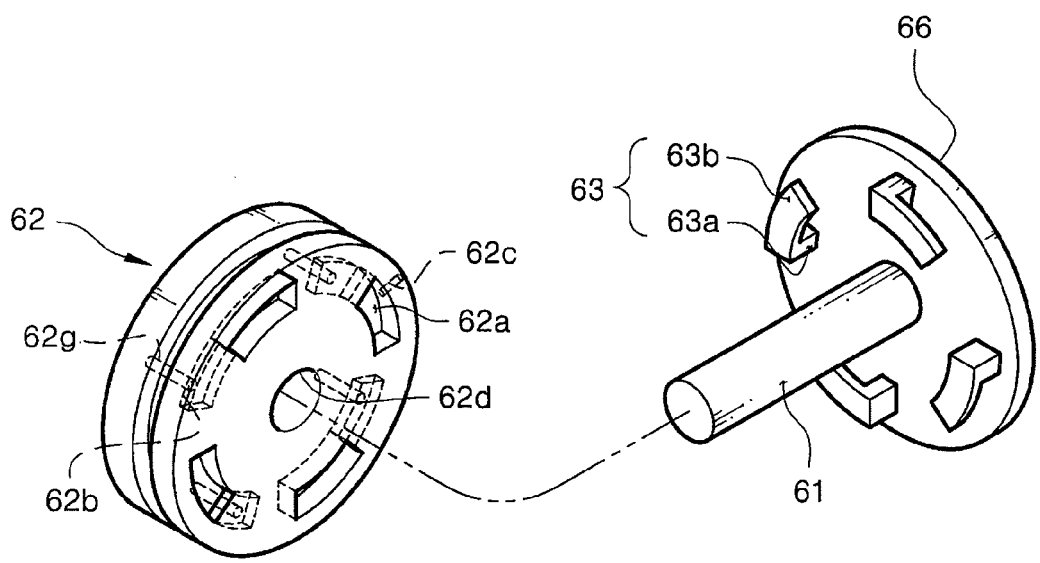
FIG. 4 is a perspective view of an embodiment of a housing and a fluid-pressurizing member of the brake actuating apparatus shown in FIG. 3, with the housing and the fluid-pressurizing member separated from each other.
Figure 5:
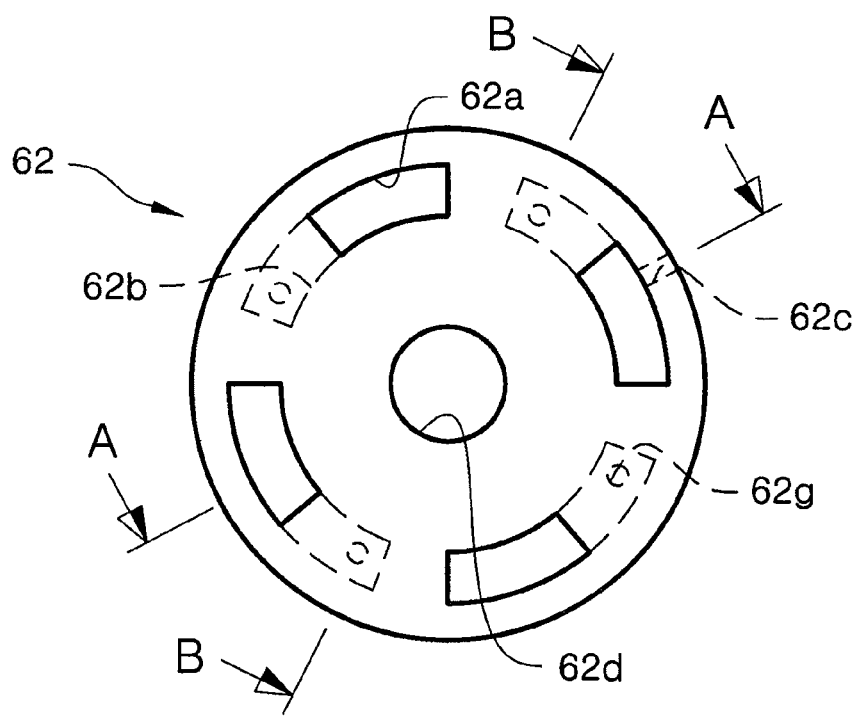
FIG. 5 is a plan view of the housing shown in FIG. 4.
Figure 6:
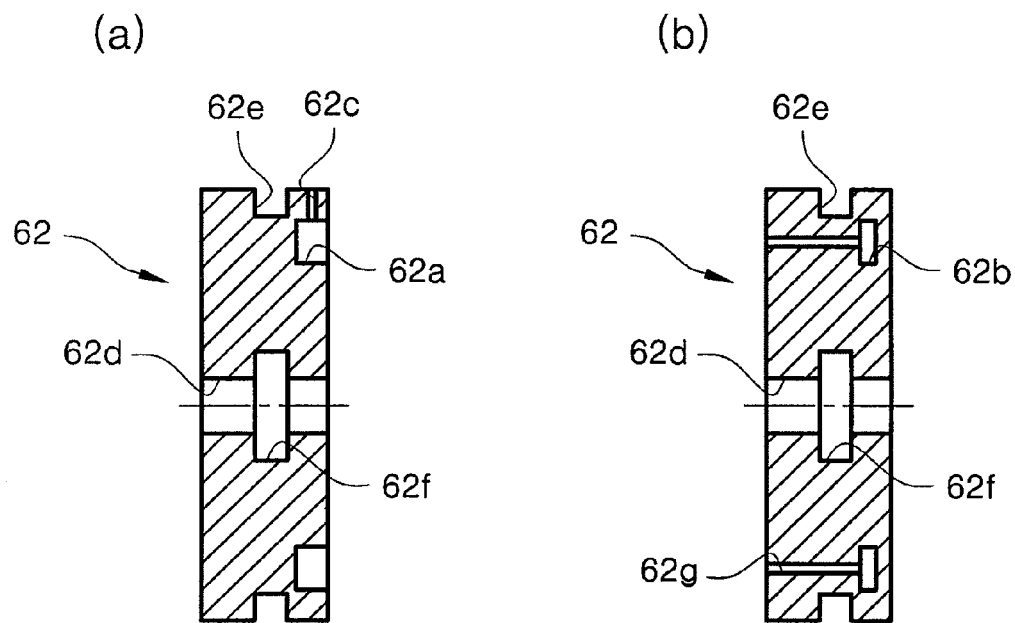
FIGS. 6 (a) and (b) are sectional views of the housing taken along line A-A and line B-B in FIG. 5, respectively.

FIG. 3 is a schematic view of a brake actuating apparatus according to another embodiment of the present invention, FIG. 4 is a perspective view of an embodiment of a housing and a fluid-pressurizing member of the brake actuating apparatus shown in FIG. 3, with the housing and the fluid-pressurizing member separated from each other, FIG. 5 is a plan view of the housing shown in FIG. 4, and FIGS. 6 (a) and (b) are sectional views of the housing taken along line A-A and line B-B in FIG. 5, respectively.

Figure 17:
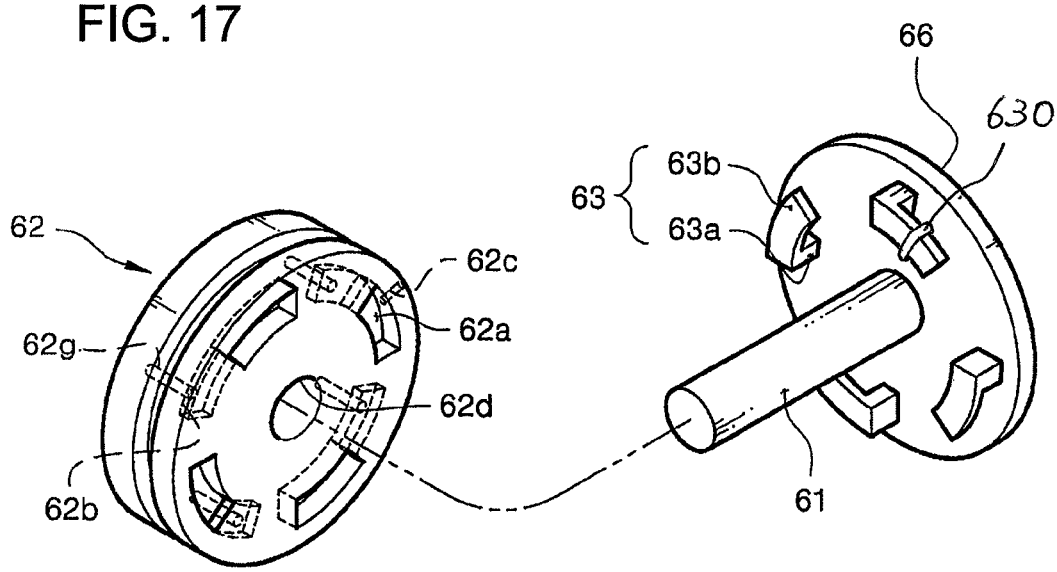
FIG. 17 is a perspective view of a modified version of the embodiment of FIG. 4.
Figure 19A:
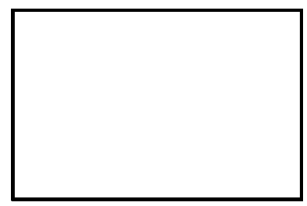
FIGS. 19A, 19B and 19C show polygonal, oval and circular sections of a fluid-pressurizing member, respectively.
Figure 19B:
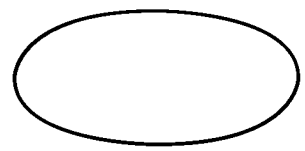
Figure 19C:
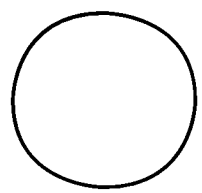

The brake actuating apparatus for a vehicle according to an embodiment shown in FIG. 3 is different from an embodiment shown in FIG. 1 in that a plurality of fluid-pressurizing members 63 are provided as shown in FIG. 4 and the brake actuating apparatus has a structure for replenishing a fluid-receiving space 72 with a working fluid if the working fluid leaks from the fluid-receiving space when the apparatus is operated for a long time. The brake actuating apparatus includes an electric motor 45 shown in FIG. 3. Referring to FIG. 17, in one embodiment, a sealing ring 630 surrounds the pressurizing member 63. Referring to FIGS. 19A, 19B and 19C, the section of the pressurizing member 63 can have a shape of polygon, oval or circle.

Referring to FIGS. 4 and 5, a housing 62 in this embodiment is equiangularly formed with four guide grooves 62a on the same circle in a front surface thereof directed toward a pressing piston 70. The plurality of guide grooves 62a take the shapes of circular arcs with the same width and central angle. Further, each of the guide grooves 62a has a first passage 62b extending by a predetermined length from a circumferential end thereof into the housing 62. The first passage 62b has the same radius of curvature as the guide groove 62a and a predetermined shape in cross section. Moreover, a second passage 62g extends at the rear side of the first passage 62b to communicate with the rear surface of the housing 62.

In this embodiment, the apparatus has fluid-pressurizing members 63 of which the number is identical with that of the guide grooves 62a and first ends 63a are equiangularly fixed at positions corresponding to the guide grooves 62a to a fixing disk 66 that is fixed to an end of the rotational shaft 61 to face the surface of the housing 62 where the guide grooves 62a are formed. That is, the fluid-pressurizing members 63 are fixedly disposed on the surface of the fixing disk 66, which is directed toward the guide grooves 62a, at the same interval as the guide grooves 62a. The first end 63a of each of the fluid-pressurizing members 63 is fixed to the fixing disk 66 and axially extends by a predetermined distance, and a second end or rod 63b thereof circumferentially extends from the first end 63a to have a radius of curvature that is substantially identical with that of the guide groove 62a and the first passage 62b. The second end 63b of each of the fluid-pressurizing members 63 is a free end and has a sectional shape that is substantially identical with that of the corresponding first passage 62b. When the housing and the fluid-pressurizing members are assembled, a portion of each second end 63b is placed in the corresponding guide groove 62a, and another portion thereof is inserted into and received in the corresponding first passage 62b. That is, upon rotation of the rotational shaft 61, the second end 63b of each of the fluid-pressurizing members 63 is rotated in the first passage 62b while being guided by the guide groove 62a. The groove or head receiver in combination with the fluid-pressurizing member or head defines a second space (for example, 65 in FIG. 3) having a second volume, which is variable depending upon the position of the head relative to the housing or plug, the second space being in fluid communication with the first space. Further, the first passage 62b and the second end 63b of the fluid-pressurizing member 63, which correspond to each other, have the substantially same shape in cross section and can be slid relative to each other in a contact state, so that if the fluid-pressurizing member 63 is moved in the first passage 62b, the working fluid in the fluid-receiving space 72 can be prevented from leaking into the first and second passages 62b and 62g. Although not shown, a sealing member may be further installed to prevent the working fluid from leaking through a clearance between the corresponding second end 63b of the fluid-pressurizing member 63 and the first passage 62b, if necessary.

Figure 18A:
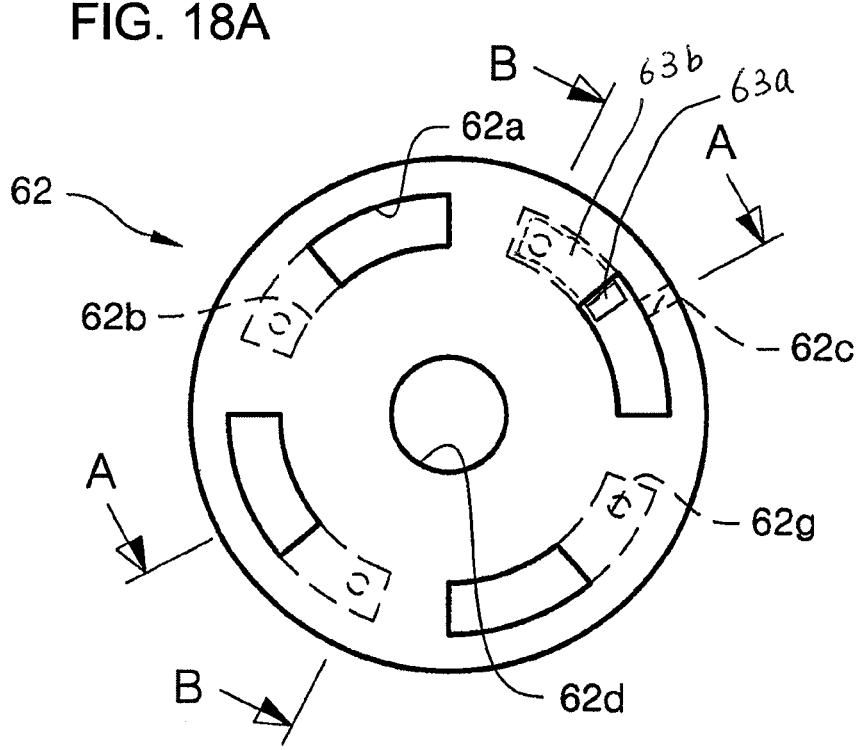
FIGS. 18A, 18B and 18C are reproduction of FIG. 5, illustrating three different positions of a fluid-pressurizing member relative to a guide groove.
Figure 18B:
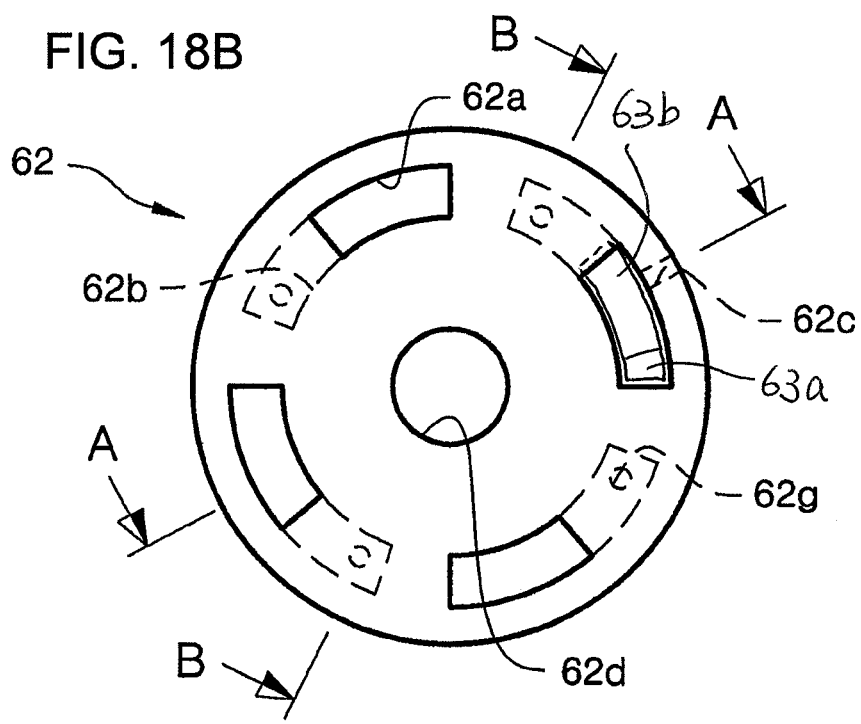
Figure 18C:
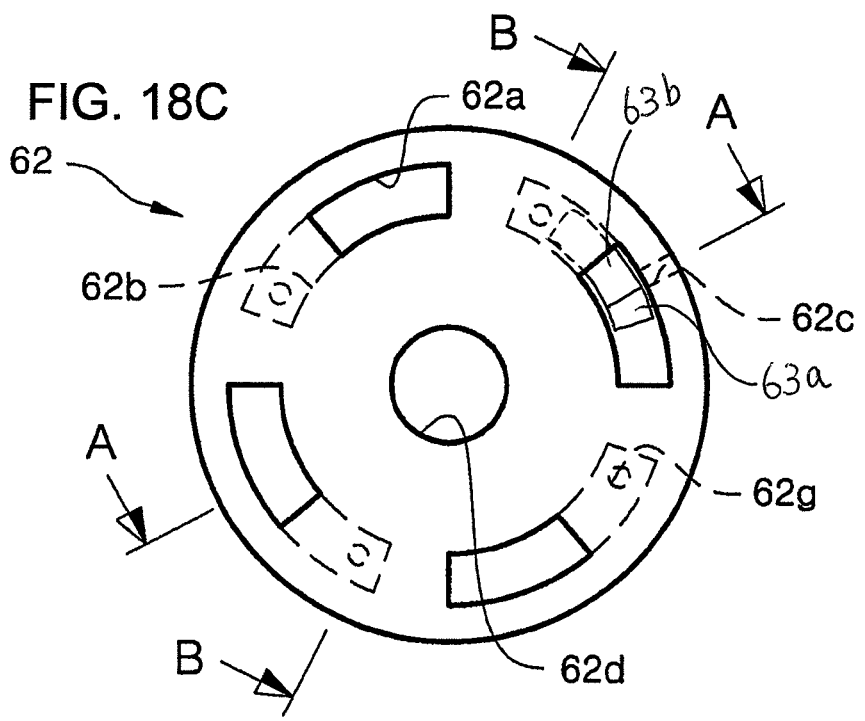

According to this embodiment, the plurality of fluid-pressurizing members 63 are simultaneously rotated, so that the moving distance of the pressing piston can be increased with a small number of revolutions of the motor. Consequentially, the responsiveness of the brake actuating apparatus can be improved. In addition, since the fluid-pressurizing members 63 are adapted to be fixed to the fixing disk 66, the brake actuating apparatus can be easily manufactured. Referring to FIGS. 18A, 18B and 18C, the fluid-pressurizing member 63 received in the guide groove 62a, in which the fluid-pressurizing member 63 is movable between a first position shown in FIG. 18A and a second position shown in FIG. 18B. The fluid-pressurizing member 63 rotates in a first rotational direction, stops at a third position shown in FIG. 18C and rotates in a second rotational direction which is opposite to the first rotational direction. As shown in FIGS. 18A, 18B and 18C, the third position is located between the first position and the second position.

Referring to FIG. 3, in the braking actuating apparatus of this embodiment, the caliper body 80 is formed with a through-hole 81 communicating with an oil-supplying hole 62c. The brake actuating apparatus further comprises an oil-supplying tank 95 that is installed on the caliper body 80 and provided with an oil-supplying port communicating with the through-hole 81 and has the working fluid contained therein. The oil-supplying tank 95 is provided with a cap used for replenishing the oil-supplying tank with the working fluid and preventing the working fluid from leaking to the outside. Referring to FIGS. 4 and 5, the oil-supplying hole 62c for use in replenishing the housing with the working fluid is formed in at least one of the guide grooves 62a of the housing 62. In this embodiment, the oil-supplying hole 62c is formed at a position to meet the following requirements. When the fluid-pressurizing member 63 received in the guide groove 62a is completely inserted into the first passage 62, the oil-supplying hole 62c should not be closed by a side surface of the second end 63b of the fluid-pressurizing member 63 so that the oil can be supplied from the outside to the fluid-receiving space 72. When the fluid-pressurizing member 63 is rotated and enters the fluid-receiving space 72 to perform braking, the oil-supplying hole should be closed by the side surface of the second end 63b of the fluid-pressurizing member 63 so that the working fluid received in the fluid-receiving space 72 cannot leak to the outside. The relationship between the position of the oil-supplying hole 62c and the positions of the guide grooves 62a and the first passages 62b is specifically shown in FIG. 5. FIGS. 6 (a) and (b) are sectional views of the housing 62 taken along line A-A and line B-B in FIG. 5, and show that the oil-supplying hole 62c is formed in an outer surface of the guide groove 62a, a groove 62f for receiving an O-ring is formed in a shaft supporting hole 62d, and a groove 62e for receiving an O-ring is formed in an outer periphery of the housing. These figures also show that the second passage 62g communicates with the first passage 62b.

Since the operation principle of the brake actuating apparatus of this embodiment is the same as an embodiment shown in FIG. 1, a detailed description thereof will be omitted.

Figure 7:
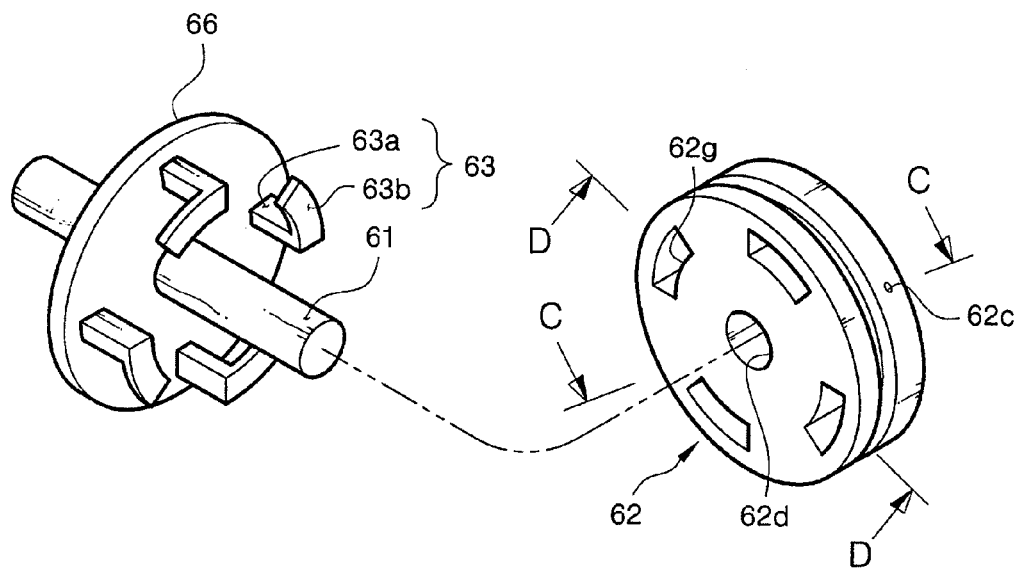
FIG. 7 is a perspective view of another embodiment of the housing and the fluid-pressurizing member in the brake actuating apparatus according to an embodiment of the present invention, with the housing and the fluid-pressurizing member separated from each other.
Figure 8:
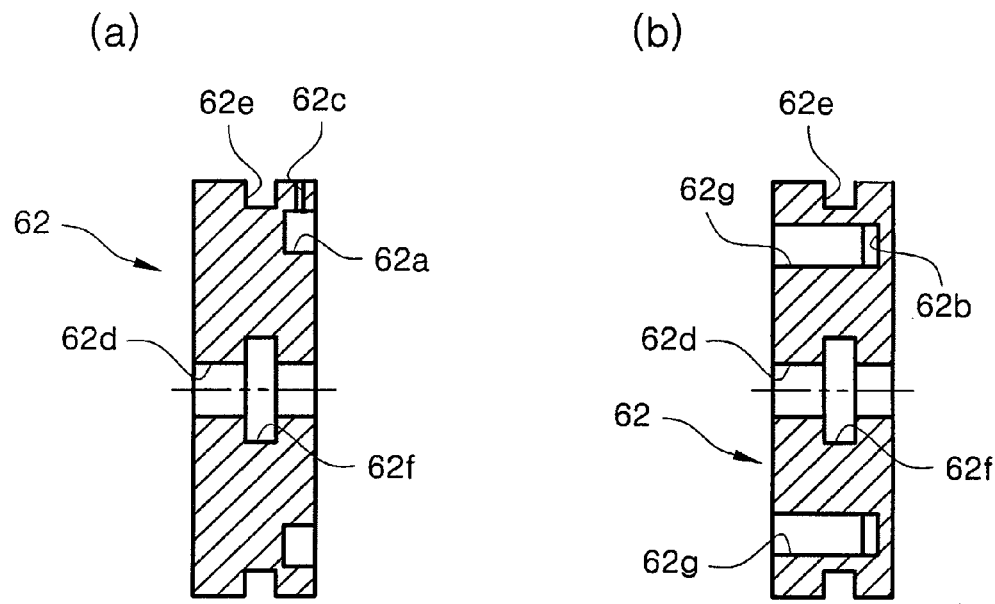
FIGS. 8 (a) and (b) are sectional views of the housing taken along line C-C and line D-D in FIG. 7, respectively.

FIG. 7 is a perspective view of another embodiment of the housing and the fluid-pressurizing member in the brake actuating apparatus according to an embodiment of the present invention, with the housing and the fluid-pressurizing member separated from each other; and FIGS. 8 (a) and (b) are sectional views of the housing taken along line C-C and line D-D in FIG. 73 respectively.

The housing 62 and the fluid-pressurizing members 63 in this embodiment are different from the housing 62 and the fluid-pressurizing members 63 shown in FIG. 4 in that the fixing disk 66 is fixed to the rotational shaft 61 such that the fixing disk 66 faces a surface of the housing 62 which is opposite to the surface thereof directed toward the pressing piston 70, the plurality of fluid-pressurizing members 63 are fixed to the fixing disk 66, and the second ends 63b of the fluid-pressurizing members 63 are inserted into the second passages 62g and then received in the first passages 62b.

Figure 9:
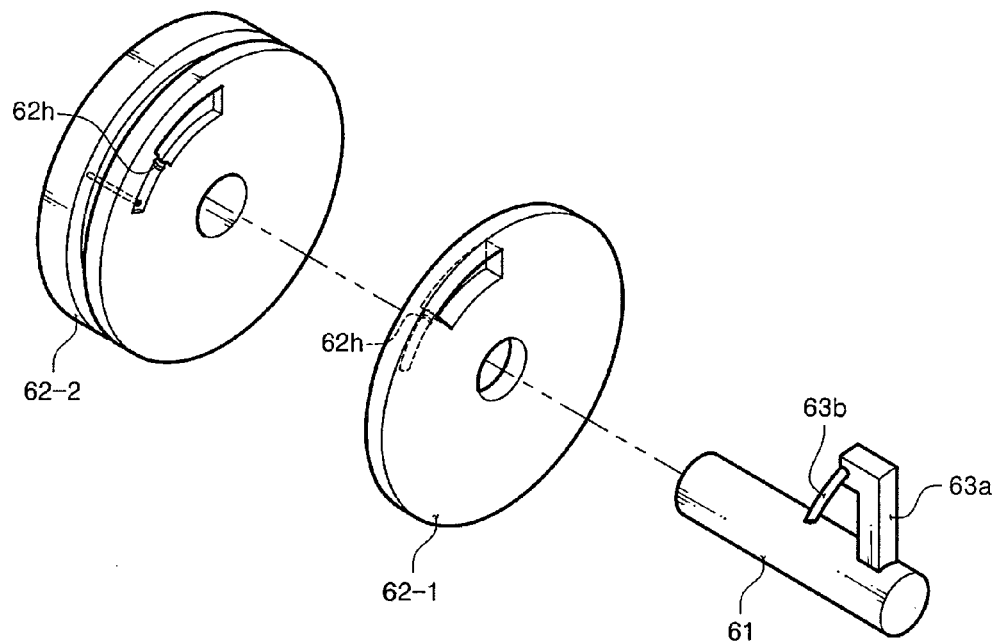
FIG. 9 is a perspective view of another embodiment of the housing and the fluid-pressurizing member shown in FIG. 2, with the housing and the fluid-pressurizing member separated from each other.

FIG. 9 is a perspective view of another embodiment of the housing and the fluid-pressurizing member shown in FIG. 2, with the housing and the fluid-pressurizing member separated from each other. The housing and the fluid-pressurizing member shown in FIG. 9 is different from the housing and the fluid-pressurizing member shown in FIG. 2 in that the second end 63b of the fluid-pressurizing member 63 takes the shape of a circle in cross section and the housing is divided into a first disk 62-1 and a second disk 62-2 for the purpose of easiness of machining, and in that the first passage 62b also takes the shape of a circle in cross section in the same manner as the second end 63b of the fluid-pressurizing member 63 and a groove 62h for installing an O-ring is formed to prevent the working fluid from leaking. For the easiness of machining, the first disk 62-1 and the second disk 62-2 are divided by a plane passing through the center of the first passage 62b.

Figure 10:
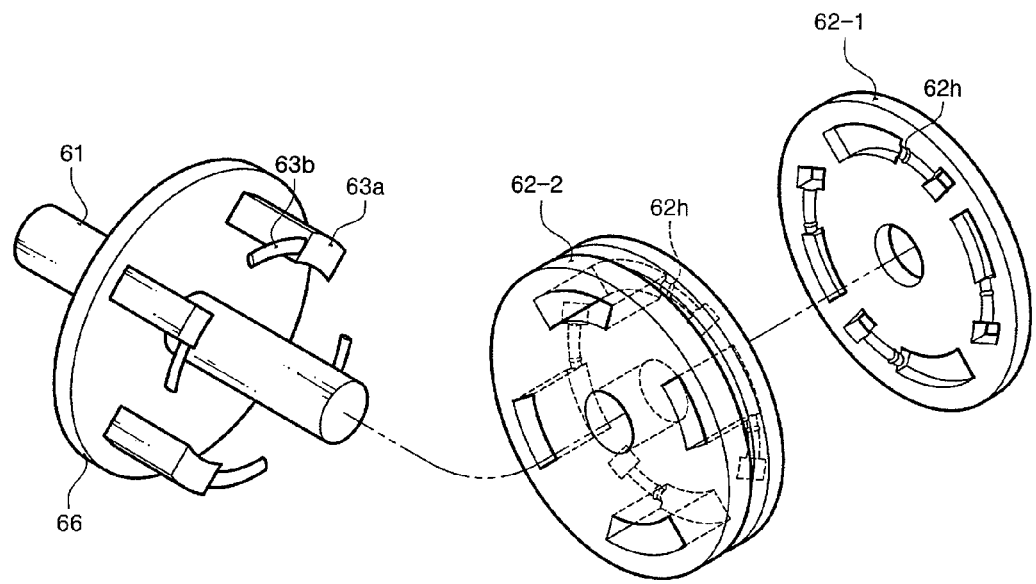
FIG. 10 is a perspective view of another embodiment of the housing and the fluid-pressurizing member shown in FIG. 7, with the housing and the fluid-pressurizing member separated from each other.

FIG. 10 is a perspective view of another embodiment of the housing and the fluid-pressurizing member shown in FIG. 7, with the housing and the fluid-pressurizing member separated from each other. The housing and the fluid-pressurizing members shown in FIG. 10 are different from the housing and the fluid-pressurizing members shown in FIG. 7 in that the second end 63b of each of the fluid-pressurizing members 63 takes the shape of a circle in cross section and the housing 62 is divided into a first disk 62-1 and a second disk 62-2 for the purpose of easiness of machining, and in that each of the first passages 62b also takes the shape of a circle in cross section in the same manner as the second end 63b of the fluid-pressurizing member 63 and a groove 62h for installing an O-ring or sealing ring is formed to prevent the working fluid from leaking. For the easiness of machining, the first disk 62-1 and the second disk 62-2 are divided by a plane passing through the centers of the respective first passages 62b.

Figure 11:
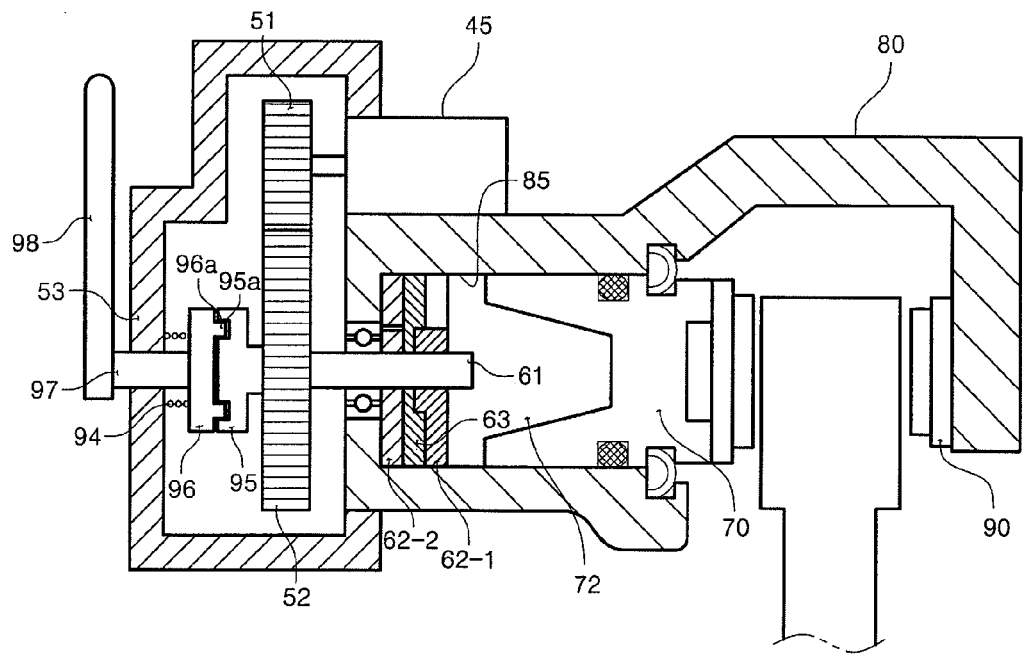
FIG. 11 is a perspective view of a further embodiment of the housing and the fluid-pressurizing member in the brake actuating apparatus according to an embodiment of the present invention, with the housing and the fluid-pressurizing member separated from each other.
Figure 12:
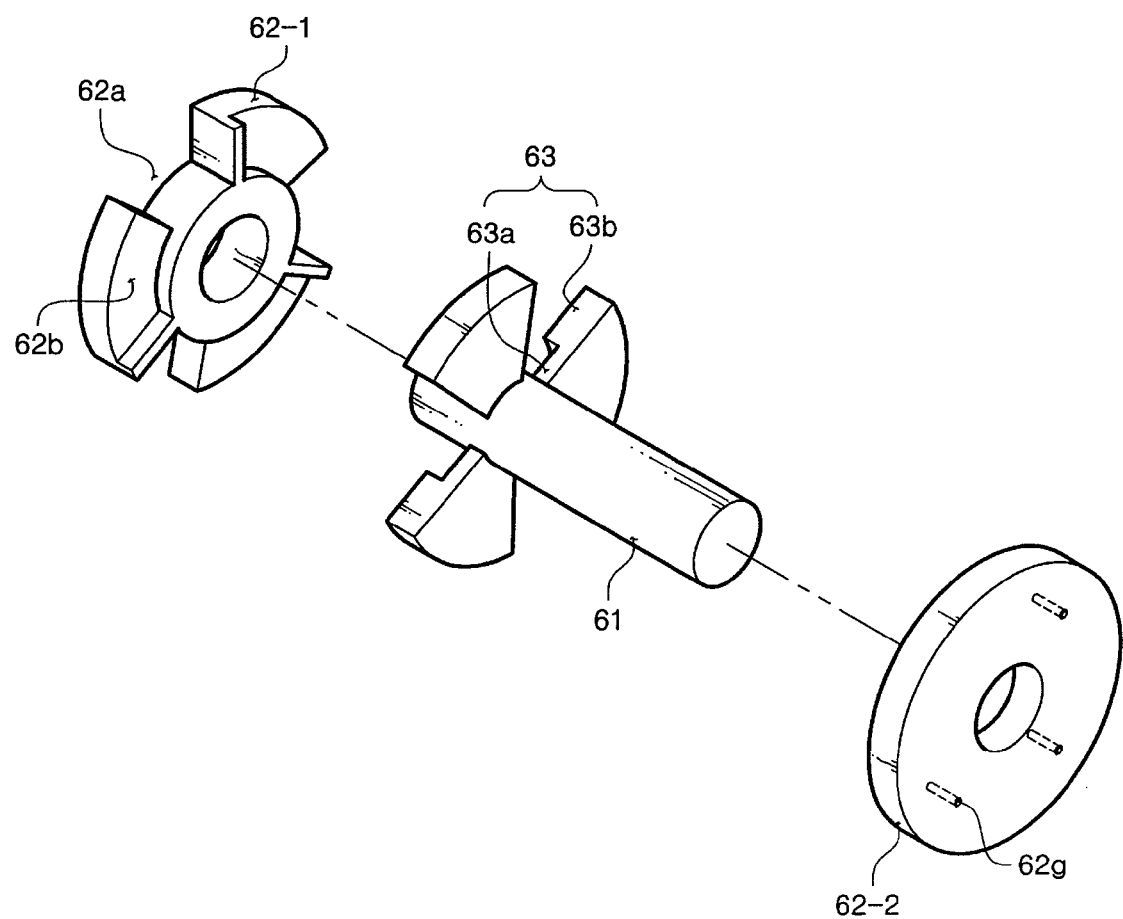
FIG. 12 is a perspective view of a still further embodiment of the housing and the fluid-pressurizing member in an electric braking apparatus according to an embodiment of the present invention, with the housing and the fluid-pressurizing member separated from each other.

FIG. 11 is a perspective view of a further embodiment of the housing and the fluid-pressurizing member in the brake actuating apparatus according to an embodiment of the present invention, with the housing and the fluid-pressurizing member separated from each other; and FIG. 12 is a perspective view of a still further embodiment of the housing and the fluid-pressurizing member in an electric braking apparatus according to an embodiment the present invention, with the housing and the fluid-pressurizing member separated from each other.

The brake actuating apparatus of this embodiment is different from the brake actuating apparatus shown in FIG. 3 in that a lever 98 is installed at the second gear 52 to rotate the rotational shaft 61 only in a direction in which the fluid-pressurizing members 63 enter the fluid-receiving space 72, and in that the housing 62 is divided into the first disk 62-1 and the second disk 62-2 and the fluid-pressurizing members 63 are provided between the first and second disks.

Referring to FIG. 11, the lever 98 is installed in a gearbox 53 of the power transmission means 50 by means of a lever shaft 97. A driven wheel 95 is fixed to the second gear 52 to mechanically rotate the rotational shaft 61, and a driving wheel 96 is fixed to the lever shaft 97 to be engaged with the driven wheel 95, thereby rotating the driven wheel 95 only in one direction. A driven groove 95a with a predetermined circumferential width and depth is formed in a surface of the driven wheel 95, which is directed toward the driving wheel 96, and a driving protrusion 96a to be inserted into the driven groove is formed in a surface of the driving wheel 96, which is directed toward the driven wheel 95. The driven groove 95a is formed to have a predetermined angle of circumference (a rotating angle of the rotational shaft), and the driving protrusion 96a is inserted into the driven groove 96a at a position where the rotational shaft 61 can be rotated only in one direction. Accordingly, if the motor is out of order or an electrical trouble occurs, the lever 98 can be pulled and rotated so as to rotate the rotational shaft 61, thereby performing mechanical braking without using the motor. Since the technical constitution for advancing the pressing piston by mechanically rotating the lever as described above is apparent to those skilled in the art, a detailed description thereof will be omitted. If a device capable of performing mechanical braking is added to the brake actuating apparatus, the device can be usefully utilized in an emergency or upon parking of a vehicle.

Referring to FIG. 12, the housing 62 in this embodiment is divided into the first disk 62-1 disposed at a front side directed toward the pressing piston 70 and the second disk 62-2 disposed at the rear of the first disk 62-1.

The guide grooves 62a and the first passages 62b are formed in the first disk 62-1, and the second passages 62g communicating with the first passages 62b are formed in the second disk 62-2. Further, some parts of a radially outer wall of the first disk 62-1 at which the guide grooves 62a will be formed, and some parts of a surface of the first disk 62-1 which is directed toward the second disk and at which the first passages 62b will be formed are removed so that the guide grooves 62a and the first passages 62b are defined by the inner periphery of the cylinder 85 to which the first disk 62-1 is fixed and a front surface of the second disk 62-2 which is coupled to the first disk 62-1. The fluid-pressurizing members 63 are installed between the first disk 62-1 and the second disk 62-2. The first end 63a of each of the fluid-pressurizing members is fixed to the rotational shaft 61, and the second end 63b thereof is formed as a stepped axial projection having a circular arc shape so that it can be inserted into the first passage 62b and enter the guide groove 62. An outer surface of the stepped projection 63b is in close contact with the inner periphery of the cylinder 85.

Figure 13:
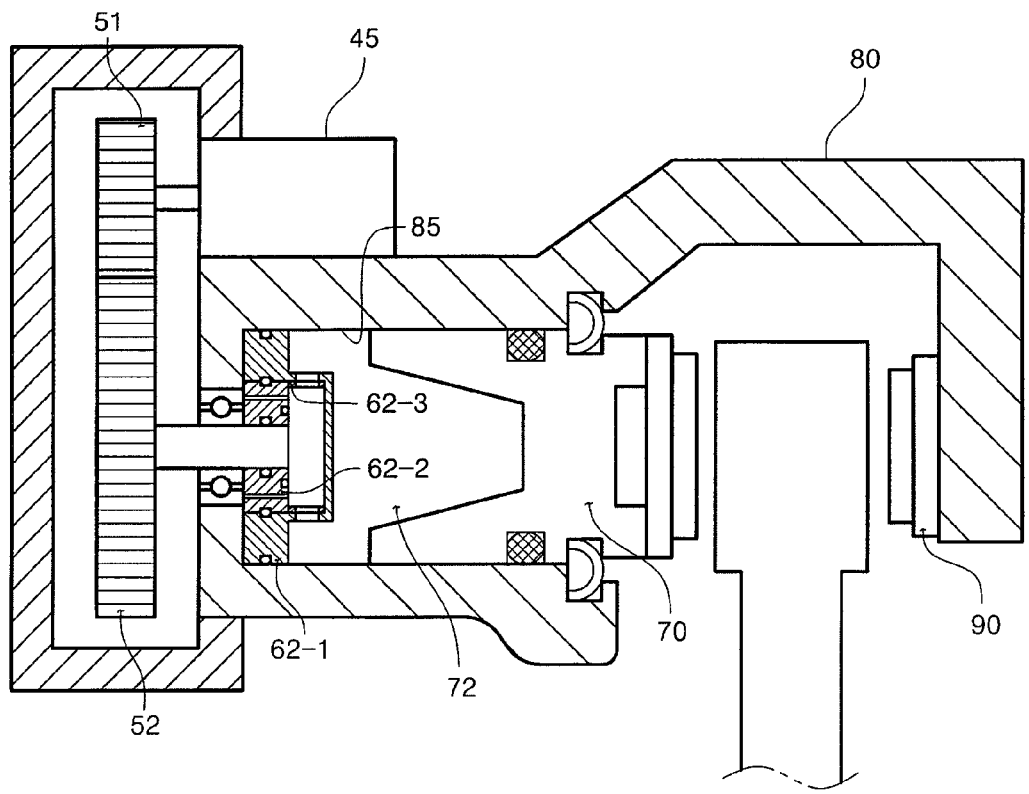
FIG. 13 is a schematic view of a brake actuating apparatus according to a further embodiment of the present invention.
Figure 14:
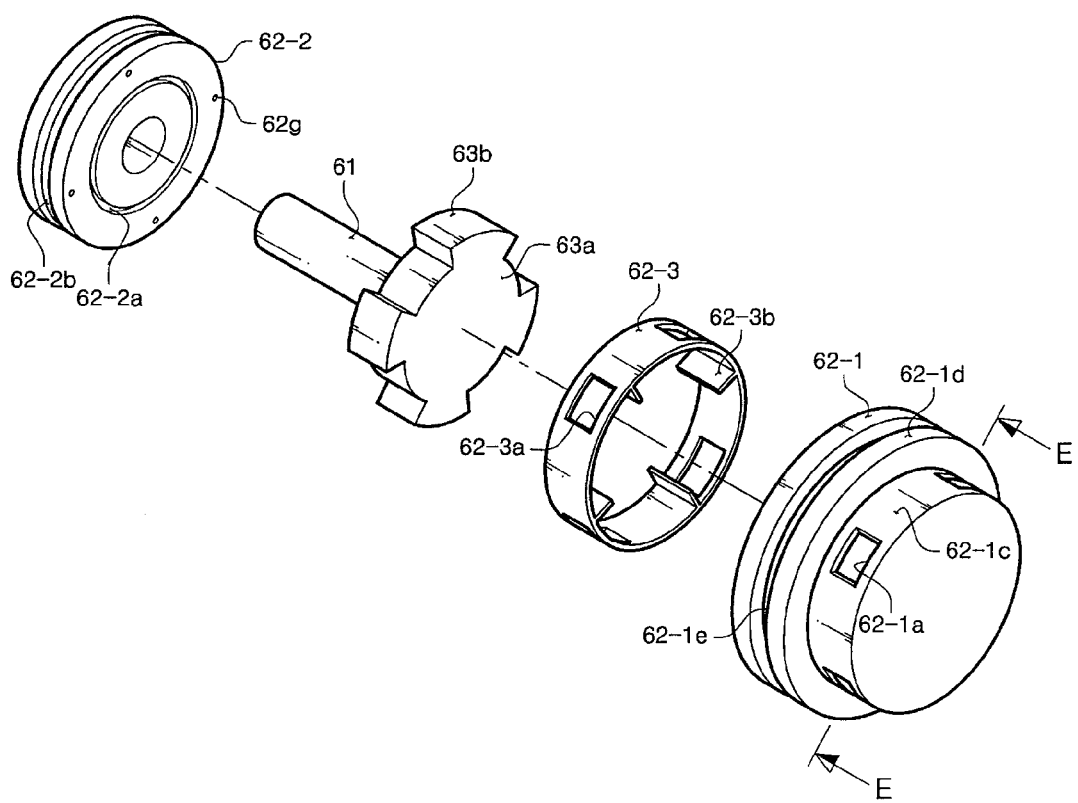
FIG. 14 is a perspective view of an embodiment of a housing and a fluid-pressurizing member of the brake actuating apparatus shown in FIG. 13, with the housing and the fluid-pressurizing member separated from each other.

FIG. 13 is a schematic view of a brake actuating apparatus according to a further embodiment of the present invention; FIG. 14 is a perspective view of an embodiment of a housing and fluid-pressurizing members of the brake actuating apparatus shown in FIG. 13, with the housing and the fluid-pressurizing members separated from each other; and FIG. 15 is a sectional view taken along line E-E in FIG. 14, showing a state where the housing and the fluid-pressurizing members are assembled.

The housing and the fluid-pressurizing members of the brake actuating apparatus of this embodiment are different from the housing and the fluid-pressurizing members shown in FIG. 12 in that the housing 62 comprises the hollow first disk 62-1 provided with a large diameter portion 62-1d and a small diameter portion 62-1c, the fluid-pressurizing members 63 to be inserted into the small diameter portion 62-1c, and the second disk 62-2 to be inserted into the larger diameter portion 62-1d. Contrary to an embodiment shown in FIG. 12, a radially inner wall of the small diameter portion of the first disk 62-1 at which the guide grooves 62a and the first passages 62g will be formed, and a surface of the first disk 61-1 which is directed toward the second disk 62-2 are removed so that the guide grooves 62a and the first passages 62g are defined by a radially outer surface of the small diameter portion 62-1c, the fluid-pressurizing members 63 inserted into the small diameter portion 62-1c and the second disk 62-2 inserted into the large diameter portion 62-1d.

In an embodiment shown in FIG. 14, for the purpose of easiness of manufacture, circumferential for defining the first passages are removed in the small diameter portion 62-1c, and an additional sidewall ring 62-3 is provided in place of the removed sidewalls. That is, the first disk 62-1 is provided with the hollow large diameter portion 62-1d and small diameter portion 62-1c, and an end of the small diameter portion 62-1c protruding toward the pressing piston 70 is closed. Four through-holes 62-1a are equiangularly formed in a side surface of the small diameter portion 62-1c, which faces the inner periphery of the cylinder. The sidewall ring 62-3 to be inserted into the small diameter portion 62-1c takes the shape of a ring with a predetermined width and is provided with through-holes 62-3a at positions corresponding to the through-holes 62-1a formed in the small diameter portion 62-1c. On an inner periphery of the sidewall ring 62-3, four sidewalls 62-3b are formed at circumferential ends of the through-holes 62-3a. Moreover, the fluid-pressurizing members 63 are inserted into and placed inside the sidewall ring 62-3. In this embodiment, the fluid-pressurizing members 63 are similar to a structure in which a spline is formed on an outer periphery of a disk with the same diameter as the inner periphery of the sidewall ring 62-3, i.e., the fluid-pressurizing members 63 take a shape obtained by circumferentially removing some parts of the outer periphery of the disk at a predetermined interval by an amount corresponding to the height of the sidewalls 62-3b. That is, protrusions of the spline correspond to the second ends 63b of the fluid-pressurizing members 63 and the other portion of the spline corresponds to the first ends 63a of the fluid-pressurizing members fixed to the rotational shaft. The second disk 62-2 is equiangularly formed with four second passages 62g and is inserted into the large diameter portion 62-1d of the first disk 62-1.

Figure 15:
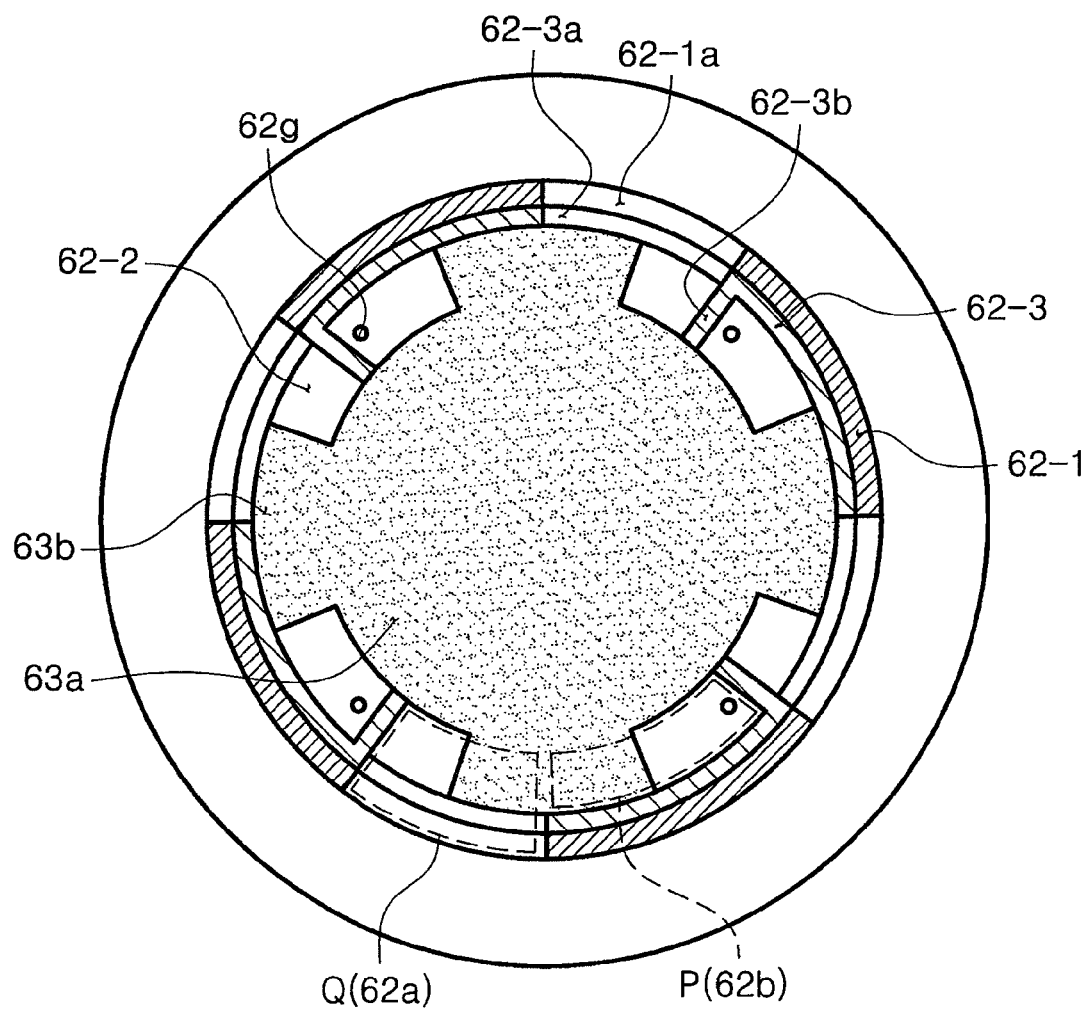
FIG. 15 is a sectional view taken along line E-E in FIG. 14, showing a state where the housing and the fluid-pressurizing member are assembled.

Referring to FIG. 15, it can be understood that the guide grooves, the first passages and the second passages are defined using the housing and the fluid-pressurizing members of this embodiment in the same manner as the aforementioned embodiments. That is, region Q denoted by a dotted line and including the through-hole 62-1a of the small diameter portion 62-1c and the through-hole 62-3a of the sidewall ring 62-3 defines the guide groove 62a, and region P denoted by a dotted line among an area in which the second end 63b of each of the fluid-pressurizing members 63 is moved defines the first passage 62b.

Although the brake actuating apparatus according to various embodiments of the present invention have been described on the assumption that all of them are used in a caliper brake for a vehicle, the brake actuating apparatus according to embodiments of the present invention is not limited thereto but can be used as an actuating apparatus for a variety of brake systems.

According to an embodiment of the present invention, there is provided a brake actuating apparatus that uses both an electric motor and a fluid and converts a rotational motion from the motor into a force for pressurizing the fluid, thereby performing a braking function, without a means for converting the rotational motion from the motor into a linear motion. Accordingly, there is provided a novel braking actuating apparatus, wherein an additional means for converting a rotational motion into a linear motion is not required and thus its structure is simplified and production costs can be reduced. Further, a pressing piston of the brake actuating apparatus can be urged with a small rotational force of the motor according to the Pascal's theory regarding a fluid, resulting in decrease in the size of the motor.

When the brake actuating apparatus according to an embodiment of the present invention is used in a vehicle, it is possible to eliminate a hydraulic circuit for braking, thereby decreasing the weight of the vehicle and reducing manufacturing costs.

Moreover, the brake actuating apparatus according to an embodiment of the present invention is provided with a mean for mechanically performing braking. Thus, even if the electric motor is out of order, the brake actuating apparatus can perform braking, thereby improving the safety of a brake system.

It is intended that the embodiments of the present invention described above and illustrated in the drawings should not be construed as limiting the technical spirit of the present invention. The scope of the present invention is defined only by the appended claims. Those skilled in the art can make various changes and modifications thereto without departing from the spirit. Therefore, various changes and modifications obvious to those skilled in the art will fall within the scope of the present invention.

What is claimed is:

1. A brake actuating apparatus, comprising:
 a caliper body comprising a cylinder, which comprises at least one fluid-contacting surface, a first end and a second end;
 a piston movably engaged with the cylinder at the first end, the piston comprising at least one fluid-contacting surface;
 a shaft rotatable about an axis;
 a plug comprising a body fixed to the cylinder at the second end, the plug comprising at least one fluid-contacting surface;
 a head connected to the shaft at a distance from the axis, the head being at least partially rotatable about the axis relative to the plug as the shaft rotates about the axis, the head comprising at least one fluid-contacting surface;
 a head receiver being a configuration formed in the body of the plug and comprising at least one fluid-contacting surface, which is other than the at least one fluid-contacting surface of the plug, the head receiver being configured to receive and liquid tightly engaged with at least part of the head, and further configured to guide rotational movement of the head relative to the plug;
 brake fluid filled in a space defined by the at least one fluid-contacting surface of the cylinder, the at least one fluid-contacting surface of the piston, the at least one fluid-contacting surface of the plug, the at least one fluid-contacting surface of the head receiver, and the at least one fluid-contacting surface of the head;
 wherein at least partial rotation of the head about the axis relative to the plug is to cause a change in a shape of the space while substantially maintaining a volume of the space, which further causes a linear movement of the piston along the axis relative to the cylinder, wherein at least partial rotation of the head about the axis in a first rotational direction relative to the plug involves at least partial rotation of the at least one fluid-contacting surface of the head about the axis in the first rotational direction, wherein the at least partial rotation of the head does not involve linear movement of the head along the axis relative to the plug.

2. The apparatus of claim 1, wherein the configuration formed in the body of the plug comprises a groove.

3. The apparatus of claim 2, wherein at least part of the head is slidably engaged within the groove.

4. The apparatus of claim 2, wherein the groove has an opening facing the piston.

5. The apparatus of claim 2, wherein the configuration formed in the body of the plug further comprises a hole extending circumferentially about the axis from the groove, and wherein the head comprises a portion engaged with the hole and slidable relative to the hole.

6. The apparatus of claim 5, wherein the portion engaged with the hole has a cross-sectional shape selected from the group consisting of circle, oval and polygon.

7. The apparatus of claim 5, further comprising a sealing ring surrounding the portion engaged with the hole.

8. The apparatus of claim 2, wherein the head receiver comprises one or more additional grooves, wherein the groove and the one or more additional grooves are disposed in the plug with the substantially same angular interval between two immediately neighboring grooves.

9. The apparatus of claim 1, further comprising a connector connecting between the shaft and the head.

10. The apparatus of claim 9, wherein at least part of the connector is located within the space.

11. The apparatus of claim 9, wherein at least part of the connector is located between the plug and the piston.

12. The apparatus of claim 1, wherein at least part of the plug is located between the head and the piston.

13. The apparatus of claim 1, wherein the plug comprises a first circular disk having a first radius and a second circular disk having a second radius, wherein the first and second circular disks are integrated with each other, wherein the first circular disk faces the space, and wherein the first radius is smaller than the second radius.

14. The apparatus of claim 1, wherein the plug comprises a through hole extending along the axis and the shaft passes through the through hole.

15. The apparatus of claim 1, further comprising an electric motor attached to the caliper body and configured to rotate the shaft.

16. The apparatus of claim 1, wherein the head is movable between a first position and a second position, wherein the head is configured to rotate in the first rotational direction, stop at a third position and rotate in a second rotational direction which is opposite to the first rotational direction, and wherein the third position is located between the first position and the second position.

17. An automobile comprising:
the apparatus of claim 1; and
a brake pad attached to at least one of the piston and the caliper body.

18. A method of actuating a brake, the method comprising:
providing the apparatus of claim 1;
rotating the shaft in a first direction so as to rotate the head about the axis and to move relative to the plug, which causes a change in the shape of the space while substantially maintaining the volume of the space, thereby causing a linear movement of the piston along the axis away from the plug.

19. The method of claim 18, further comprising rotating the shaft in a second direction opposite to the first direction so as to rotate the head about the axis and move relative to the plug, which causes a change in the shape of the space while substantially maintaining the volume of the space, thereby causing a linear movement of the piston along the axis toward the plug.

20. The apparatus of claim 1, wherein the head does not comprise a mechanism for converting the at least partial rotation to linear movement thereof.

\* \* \* \* \*